INVENTOR.
William F. Carr

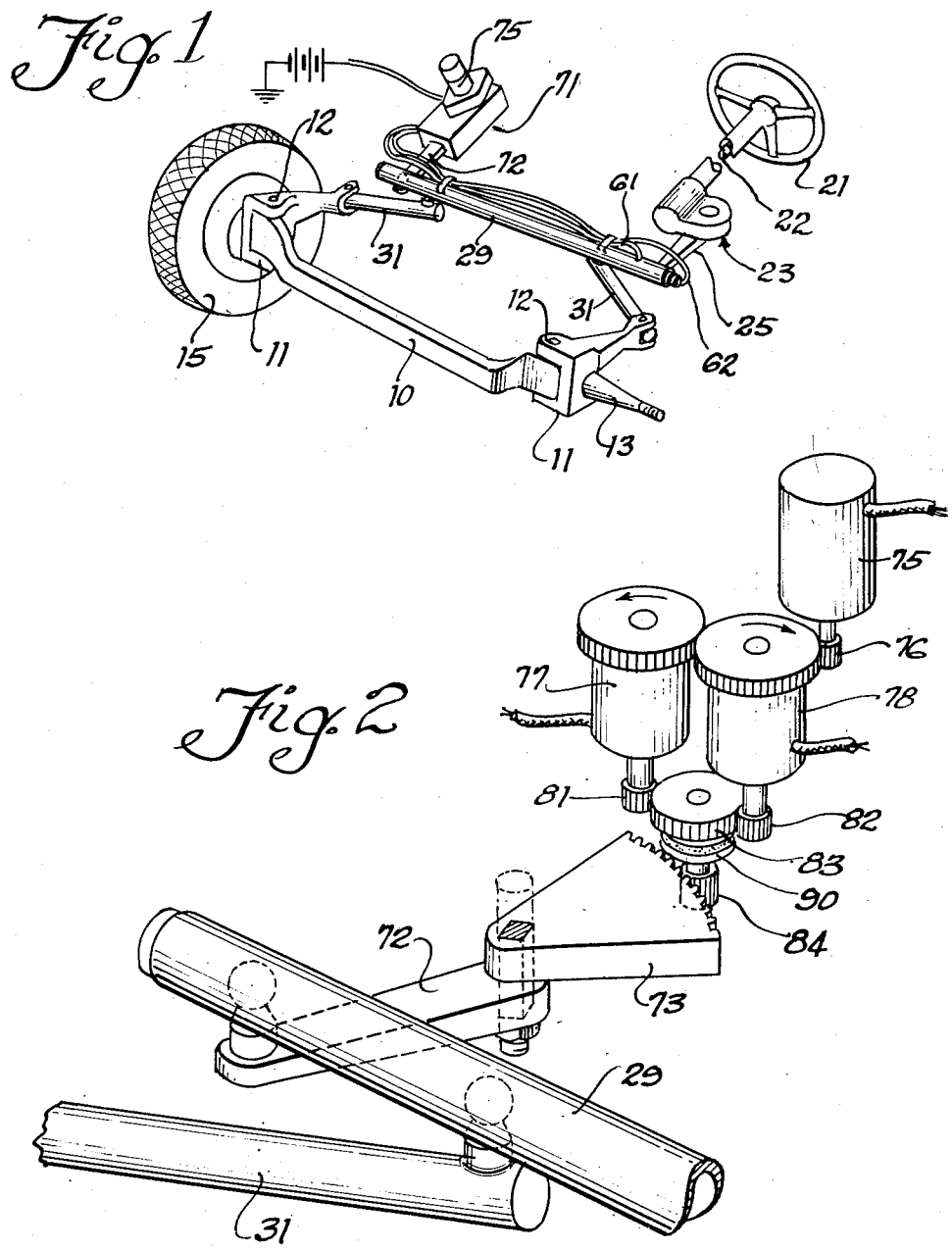

Jan. 21, 1958 W. F. CARR 2,820,872
ELECTRICAL BOOSTER FOR POWER STEERING WITH
VARIABLE RESISTANCE CONTROL
Filed Aug. 31, 1953 3 Sheets-Sheet 3
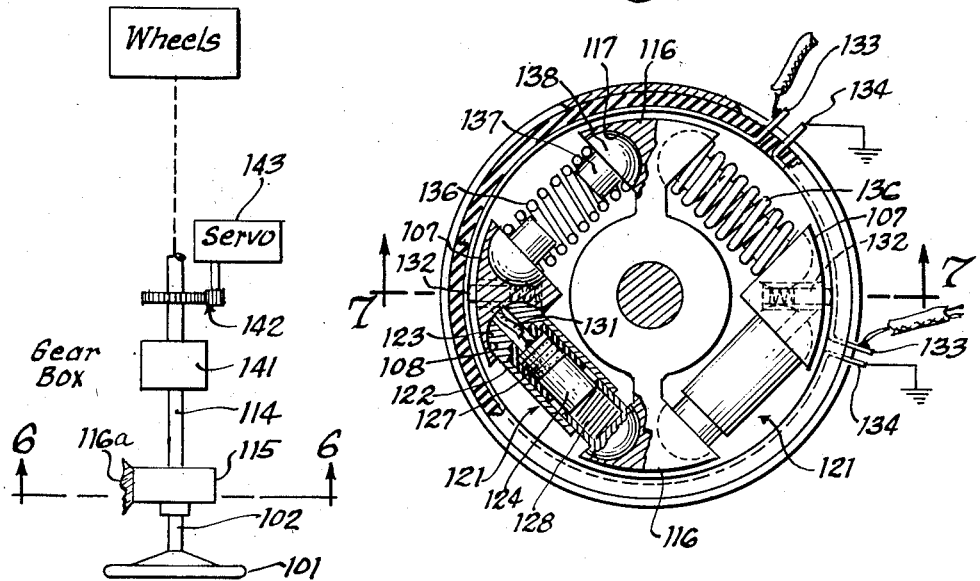
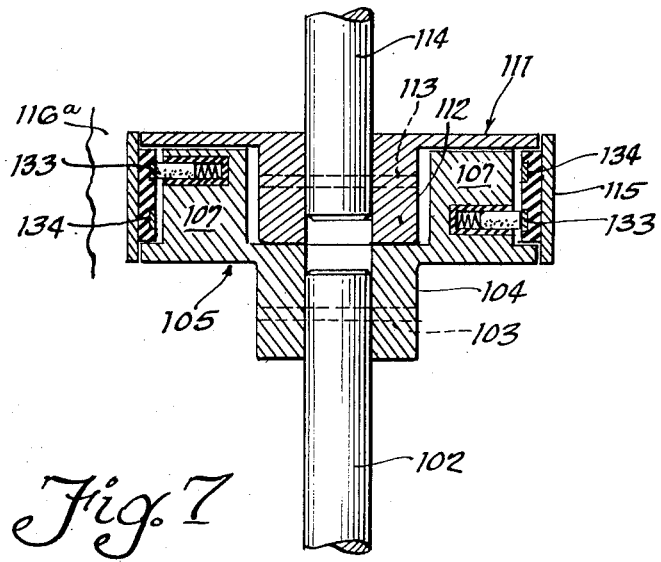
INVENTOR.
William F. Carr United States Patent Office 2,820,872
Patented Jan. 21, 1958

2,820,872

ELECTRICAL BOOSTER FOR POWER STEERING WITH VARIABLE RESISTANCE CONTROL

William F. Carr, Grand Rapids, Mich., assignor to Lear Incorporated, Grand Rapids, Mich.

Application August 31, 1953, Serial No. 377,427

2 Claims. (Cl. 201—51)

This invention relates to a boost system for providing supplementary power actuation of the steering mechanism of a dirigible vehicle in response to manual force applied to the ordinary steering control.

Systems for accomplishing the foregoing object are known wherein hydraulic pressure is the power-exerting medium. However, in those known to me power boost is unavailable when the engine is off, for the reason that the hydraulic pump must be in operation whenever boost is to be availed of. During ordinary travel, while power boost of the steering is an appreciable adjunct, full benefit is derived from this feature principally during parking or in leaving a parked position; and especially so where a car in front and one to the rear require considerable maneuvering to extricate the vehicle from the cramped quarters.

Another important requirement for an idealized boost system of the type contemplated herein is "feel." By this term I refer to the reaction of the steering wheel to the vehicle's movements and as sensed by the operator. Power boost necessarily relieves the operator of the largest part of the power required for steering. Consequently the wheel "feels light," as compared to conventional, i. e. non-boost arrangements. Thus a boost system should be capable of providing some immediate and sensible reaction whereby the operator may "feel" the steering movement without having actually to expend more than the bare effort required to rotate the steering wheel in the desired direction and to the desired angular extent. Hydraulic boost systems fail in providing an idealized "feel." Accordingly, an object of this invention is to provide a power boost arrangement for an automotive steering gear having an idealized feel.

Another requirement of a boost system is ability of the steering mechanism to recover following a turn. Camber, caster and toe-in of the front wheels of ordinary automotive vehicles are designed to restore the same to normal, i. e. straight forward, following a deviation therefrom. The ability of a boost system to allow such recovery is a measure of its practicality. Hydraulic systems known to me fail to exhibit the desired degree of recovery. An object of this invention is to provide a steering boost system characterized by unrestricted recovery.

Another object of the invention is to provide a boost system characterized by a minimum of lost motion at the steering wheel.

Still another object is to provide a boost system as aforesaid in which the torque exerted thereby is practically linearly proportional to the manual torque applied to the steering wheel.

Other objects will become apparent from the ensuing description which, taken in conjunction with the accompanying drawings, discloses certain preferred forms which the invention may assume in practice.

In these drawings:

Fig. 1 is a perspective view in somewhat schematic form showing the invention system combined with one conventional form of automobile steering gear;

Fig. 2 is a perspective view, also schematic, to illustrate the power unit and its connection to the drag link;

Fig. 5 is a schematic layout of an alternative form of the invention;

Fig. 6 shows a cross section taken on the line 6—6 of Fig. 5; and

Fig. 7 is a cross section taken on the line 7—7 of Fig. 6.

Figure 3:
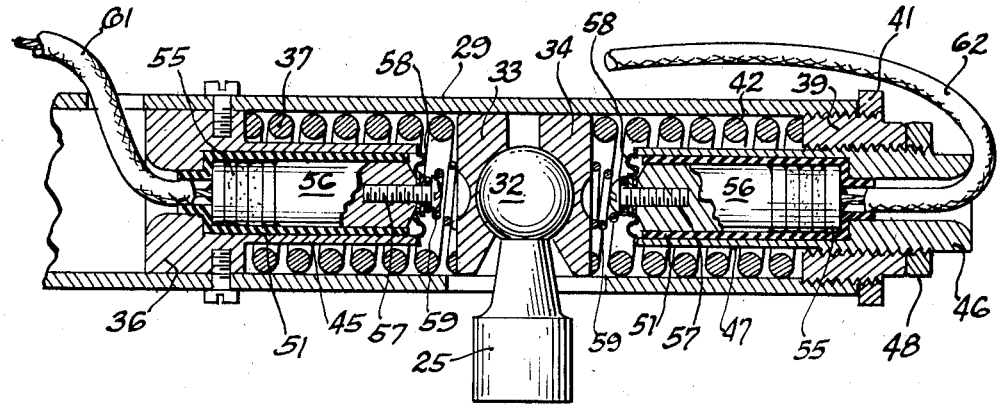
Fig. 3 is an enlarged longitudinal cross section of the sensing unit, as viewed looking toward the rear of the vehicle.

Regarded broadly the invention contemplates the interposition between a member receiving manual force or torque directly from the steering wheel or equivalent driver's control member, and the linkage which rotates the steered wheel or wheels of the vehicle, of a novel form of sensing device for translating the manual force or torque into variation in a voltage, preferably by the use of a carbon pile or other electrical device which presents to the circuit a resistance or impedance variable in accordance with the mechanical pressure applied thereto. By arranging a pair of such sensing devices for differential operation both the magnitude and sense of the steering force or torque may be measured and utilized. (Where herein I employ the term "impedance" the same is intended to embrace both resistance in the A. C. and D. C. environments as well as impedance in the A. C. environment. In the event the system is energized by A. C. then sense will be determined by oppositeness of phase rather than polarity.) Mechanically connected to the linkage which operates the steered wheels, such as the conventional gear box, pitman arm, drag link and links connecting the steering knuckles, is an electrically driven power unit comprising a motor and a bi-directional output shaft, which latter may be driven from the motor through a pair of individually selectible contra-rotating clutches. By means of suitable circuitry including a source of voltage, the motor and the sensing device, the output shaft may be caused to rotate in a sense and with a torque corresponding to the direction and strength of movement imparted by the steering wheel and, by appropriate linkage of the output shaft to the wheel-turning mechanism desired power boost is imparted.

In its principal aspect the invention is intended to be incorporated with the more conventional type of steering mechanism as used on present-day passenger automobiles. Such mechanism includes a drag link of hollow tubular construction and which is ideally suited, with only trifling adaptation, to the reception of a sensing device of the character to be disclosed herein.

Furthermore the idler connecting link suspending one end of the drag link may be utilized for receiving a simple connection from the invention power unit. In short, the invention system is so constructed and arranged as to be capable of sale as a "package" and adaptable at very little expense and by a person having only nominal mechanical skill to automotive vehicles already in service, and even more easily to vehicles during their manufacture.

Where, herein, reference is made to a "conventional" steering gear I intend to comprehend an arrangement whose components are included in Fig. 1. Variations from this standard are encountered but it will be apparent from what follows that the elements of the invention are equally adaptable to those also, and with very little change in the arrangement.

Turning first to Fig. 1 there is shown by way of example, a portion of the chassis 10, sometimes called the front axle, upon which, by means of the king-pins 12—12, are pivoted the steering knuckles 11—11. Each knuckle includes a spindle 13 upon which the steered wheels 15 are supported, all as is well-known.

In the illustrated arrangement steering is accomplished manually by means of a steering wheel 21, which, through a shaft 22 and worm gear 23 is effective to pivot the pitman arm 25 in one direction or the other. Conventionally the free end of the arm 25 terminates in a ball adapted to work against one or the other of a pair of comparatively stiff compression springs (not shown) mounted within a tubular drag link 29. Thus, motion of the arm 25 in one sence or the other is effective to translate the link 29 to the left or right. Connection between the link 29 and knuckles 11—11 is through wheel connecting links 31—31 pivoted at their ends in an obvious manner. The springs taking the force of the pitman arm enable absorption of fluctuating loads due to road shock and obstructions and thereby prevent the transmission thereof to the parts of the steering system and to the operator's hands and arms with the otherwise accompanying physical and mental exhaustion and annoyance. Notwithstanding substantial irreversibility of the gear box 23 there still exists a tendency, principally due to back lash, for some degree of reversibility, and the undesirable conditions just outlined.

In carrying my invention into practice I continue to utilize the springs aforesaid and their function except that a slight rearrangement of the appurtenant parts becomes necessary to combine therewith the electrical sensing device of the invention.

Hence, turning specifically to Fig. 3, I show the forward end of the pitman 25 terminating in the usual ball 32 seated upon a pair of pads 33 and 34. An abutment 36 is secured by means of screws to the link 29 and accommodates one fixed end of a compression spring 37 interposed between it and the pad 33. Similarly a second abutment in the form of a screwed plug 39 and lock nut 41 acts as the fixed stop for a second compression spring 42 interposed between it and the pad 34. As just described the arrangement is substantially conventional, and by its means movement of the ball 32 in response to manipulation of the steering wheel 21 will actuate the link 29 to the left or right with the proper degree of positive effort and the shock-absorbing quality of the arrangement unimpaired.

Abutment 36 carries a tubular projection 45, and abutment 39 carries a threaded plug 46 including a similar projection 47. A lock nut 48 enables maintenance of a suitably adjusted position of the plug 46.

Each of the tubular projections 45 and 47 is fitted with an electrically-insulating sleeve 51—51 which receives a plurality of buttons 55—55 of compacted carbon particles or equivalent material characterized by variation in electrical resistance in correspondence with mechanical force applied thereto. Alternatively, and within the contemplation of the invention, other devices of similar function may be utilized, e. g. electrically-conductive plates separated by a suitable dielectric and acting as a condenser or a coil having variable inductance as by variation in the permeability of the core thereof under pressure or physical movement, or equivalent magnetostrictive devices. Essentially, the sensing device is one which will translate an applied force into a variation in voltage drop across an electrical impedance of a desired polarity or phase, and will do so in a substantially linear manner. Carbon buttons are preferred for ability to withstand the severe vibration to which the device is subjected in use.

A metallic plunger 56 is slidably supported within each sleeve 51 and is attached by means of a screw 57 to a diaphragm 58 and conical compression spring 59. This latter abuts the adjoining pad 33 or 34 and provides a normal impedance for both group of buttons 55—55 when the ball 32 is in its central, or normal position, corresponding to zero deviation of the steered wheels. The diaphragms 58—58 are brazed to the projections 45 and 47 and seal the interior of the projections against entry of dirt and grease while permitting the necessary reciprocation of the plunger.

One terminal of each of the groups of buttons 55—55 is connected to ground through the plunger 56 and the other metal parts in contact therewith, and the other, or insulated connection is made via conductors 61 and 62, as is apparent from Fig. 3.

At this juncture it is deemed expedient to describe functioning of the sensing device just described.

Torque applied to the pitman arm 25 by virtue of manual steering torque eventuates as force at the ball 32, and is exerted to the left or right, as the case may be. Consequently, normal steering effort is conducted through the drag link 29 in an obvious manner, one or the other of the springs 37 or 42 undergoing some degree of deformation depending upon the resistance offered to the steering effort. Deformation of a spring is equivalent to movement of a pad 33 or 34 and the application of force to a plunger 56 through an associated spring 59. However, the movement sensed by the carbon buttons is the result of the differential action of the springs 37 and 59. Stated otherwise, deformation of the spring 37 is directly proportional to the force applied thereto, and such deformation, in turn, is sensed by the spring 59 and transmitted as a much smaller movement to the carbon buttons. The spring 59 is designed with a much smaller constant than that of the spring 37 or 42 in order that only a minute displacement of the plunger 56 results from the customary displacement of the pad 33 or 34 relative the drag link 29. It will be recognized that a carbon button resistor, for example, might be compressed only a few ten-thousandths of an inch in order to provide a utilizable change in electrical resistance.

Moreover, it will be comprehended that the respective variation of resistance, of the group of left and right hand buttons 55—55 may constitute a differential action. Thus, by suitable selection of the constant of the springs 59—59, the resistance of one or the other group of buttons may be varied above or below a predetermined, or null value. For preliminary adjustment of such value the plug 39 may be availed of.

It will be noted that no alteration in the dimensions of the conventional parts of the steering gear is required except for providing a threaded aperture in the abutment 39. The remaining parts are fitted within the space already available interiorly of the springs 37 and 42.

By preliminary biasing of a single impedance device, as for example, a single carbon button or plurality thereof, by suitable initial force, decrease and increase in said force may be utilized as the two necessary directional senses required by the device.

Secured at a convenient point on the vehicle chassis is the power unit, designated comprehensively as 71, and shown in detail in Fig. 2. Conventionally the free end of the drag link, i. e. the end opposite the pitman arm 25, is pivotally supported for parallelogrammatic movement on an idler link pivoted at its ends to the chassis and drag link. Such link, in the invention, is replaced by an arm forming a part of a gear sector 73 suitably pivoted in the frame of the power unit 71.

Output of the power unit is evidenced as rotation of the sector 73, and therefore of the arm 72 in one direction or the other to provide boost for the drag link 29 in supplementation of the manually applied effort.

To this end an electric motor 75 having an output pinion 76 is arranged to drive a pair of contra-rotating clutches 77 and 78, geared together and to the pinion 76, as shown. Each clutch respectively has an output pinion 81 and 82 commonly meshed with a gear 83 fixed on a shaft with a pinion 84 driving the sector 73. Each clutch is arranged to be energized selectively in accordance with the sensing device of Fig. 1, and by means of a circuit to be detailed.

As will be apparent energization of one or the other of the clutches 77 or 78 will result in left or right movement of the drag link 29 in a degree to provide boost in proportion to the applied torque. Clutches 77 or 78 may be of any suitable type, preferably electromagnetic, and of the recently developed species which utilizes powdered iron as the clutching medium, for example, as disclosed in the co-pending, commonly owned application of William P. Lear, Serial No. 214,901, filed March 10, 1951.

As a safety feature it may be desirable to interpose a slip clutch 90 or equivalent device intermediate the sector 73 and gear 83 so that, in the event a clutch 77 or 78 is electrically shorted the step-down reduction gear would render manual override back to the motor virtually impossible and, in such case the slip clutch will allow manual operation of the steering mechanism.

Figure 4:
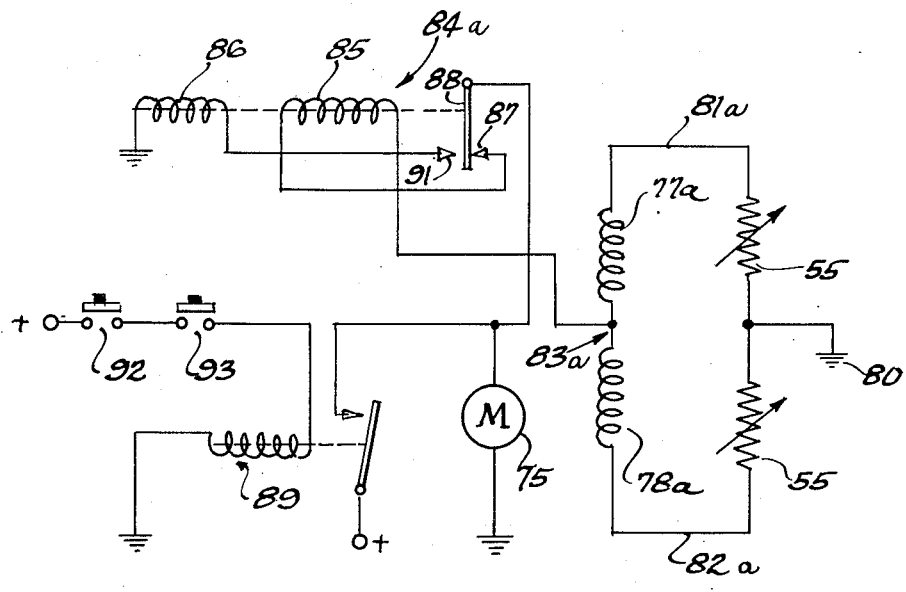
Fig. 4 is a circuit diagram.

A preferred, and simple circuit is illustrated in Fig. 4. The sensing device, including the resistors 55—55, is shown schematically as a pair of variable resistances.

The respective coils of the contra-rotating clutches are indicated at 77a and 78a and are linked to their associated variable controlling resistances 55—55 by conductors 81a and 82a. Common ground is shown at 80 and plus battery at 83a.

For reasons of safety, for example, in the event some overload may cause one of the clutch coils to draw a dangerous current, I provide a relay 84 having an overload winding 85 and a holding winding 86. One end of the winding 85 is connected to junction 83a of the clutch coils and the other end to the back contact 87 of armature 88, and this latter is connected to the contact of power relay 89. Plus battery is connected to the armature thereof. The winding 86 is connected to the front contact 91 of relay 84a and to ground, as shown.

The vehicle's ignition switch is shown at 92, and an independent switch for turning the invention system on and off is shown at 93, and when both are closed plus battery will be applied to the power relay 89 to connect plus battery to the invention components. Motor 75 is connected across plus battery, as established through the power relay and ground. Similarly plus battery is connected through armature 88, contact 87 and coil 85 to junction 83a. Accordingly, clutch current is drawn also through winding 85. In the event of overload armature 88 will be drawn to its back contact removing plus battery from the clutch coils and energizing holding winding 86. As long as excess current continues armature 88 will remain attracted. However, upon elimination of the cause of difficulty the circuit may be re-established by momentarily opening and then reclosing switch 92 or 93.

An alternative form of the invention is shown in Figs. 5, 6 and 7, and is particularly adapted to steering mechanisms not having a drag link or equivalent member which will permit utilization of the sensing device heretofore described.

The steering wheel 101 (Fig. 5) is rigidly connected to the shaft 102 which is pinned at 103 to the hub 104 of a member 105 (Fig. 7). This latter includes a pair of integral posts 107—107 of substantially sectoral cross section and having in each of the flat faces thereof a hemispherical recess 108.

Adapted for rotation relatively to the member 105 is a similar member 111, also including a hub 112 pinned at 113 to a shaft 114. Both members 105 and 111 are rotatably supported in an annular cage 115 secured to any convenient fixed part of the vehicle, as indicated at 116a. Member 111 also is provided with a pair of sectoral posts 116—116 having hemispherical recesses 117.

Interposed between adjacent recesses of a post 107 and a post 116 is a pair of sensing devices 121—121 similar in general construction and function to the device of Fig. 3. Each device comprses a shell 122 having a hemispherical head 123 arranged to swivel in the associated recess 108. Received in the shell 122 is a plunger 124 bearing on a plurality of carbon buttons 127. A compression spring 128 provides initial bias on the buttons and serves to transmit force to the same in proportion to the relative movement of the plunger and shell. Accordingly, relative rotation in one direction or the other between the members 105 and 111 will be effective to compress one of the devices 121 and relieve the normal pressure on the other resulting in the desired differential action of the buttons 127 heretofore pointed out in connection with Fig. 3.

Ungrounded connection with each of the devices 121 may be accomplished by conductors 131—131 connected to brushes 132—132 and wiping on slip rings 133—133. The ground connection may be constituted by uninsulated slip rings 134—134, in an obvious manner.

In order to preserve a predetermined normal angular relationship between the members 105 and 111 a pair of heavy compression springs 136—136 may be availed of. To avoid the effects of radial stress these springs are preferably carried at their ends on the shanks 137 of hemispherically headed studs 138, these latter being swivelly seated in the recesses 117.

Normal manual steering is accomplished from shaft 102 to shaft 114 through the medium of the sensing arrangement detailed in Figs. 6 and 7, and through any form of reduction gearing 141 appurtenant to the mechanism of the vehicle under consideration. Power boost is supplied to the output of the gearing 141 by means of gearing 142 driven by the power unit 143. This latter may be generally of the bi-directional character disclosed in Fig. 2, and will be controlled by the sensing arrangement of Fig. 6 through the circuit of Fig. 4.

As a kit that form of the invention described in connection with Figs. 1 to 4 may be installed by a mechanic using only simple tools.

The arrangement is inexpensive, light, simple and safe, and provides virtually linear "feel" and boost. When driving slowly, or during parking maneuvers, full boost power is available with finger-tip wheel pressure. The system is sensitive to the point that a cross-wind will be detected by the sensing devices, and corrected for. These devices may be readily adjusted for sensitivity to suit a particular car or driver's preference.

Current consumption may be compared to that of the vehicle's lighting system.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

I claim:

1. A device for translating a force variable in magnitude and direction into a voltage having a corresponding magnitude and sense for actuation of a control circuit comprising an elongated support having an abutment at each end thereof, a pair of coiled compression springs each seated at one end on a respective abutment, an impedance device positioned within each of said springs and of a character which presents a variable impedance in accordance with pressure applied thereto, a member interposed between the other ends of said springs movable axially of said springs for receiving the variable force and transmitting the same to one or the other of said springs, and a second pair of compression springs one individual to each impedance device and interposed between said member and device for transmitting movement of said member in one direction or the other to one of said second pair of springs or the other while deforming one of said first pair of springs or the other.

2. A device for translating an applied force variable in magnitude and direction into a voltage having a corresponding magnitude and direction for actuation of a control circuit comprising a support, a pair of cylindrical casings each having an open end and mounted on said support with said ends confronting, a carbon resistor seated within each casing and a plunger guided in each said casing and arranged to bear on the resistor, a compression spring surrounding each casing and having one end fixed commonly with the fixed end of the casing, an element interposed between the free ends of said springs and means for applying the force to the element to compress one or the other of said springs, and a second pair of springs one interposed between each plunger and said element, the spring constant of said first pair of springs being greater than that of the second pair.

References Cited in the file of this patent

UNITED STATES PATENTS

| | | |
|---|---|---|
| 1,376,271 | Gouge | Apr. 26, 1921 |
| 1,472,257 | Titterington | Oct. 30, 1923 |
| 2,132,023 | Fuller | Oct. 4, 1938 |
| 2,167,224 | Ulinski | July 25, 1939 |
| 2,311,321 | Zigan | Feb. 16, 1943 |
| 2,368,741 | Bowling | Feb. 6, 1945 |
| 2,553,795 | Staude | May 22, 1951 |
| 2,587,377 | Penrose | Feb. 26, 1952 |